United States Patent
Takanohashi et al.

(10) Patent No.: US 6,305,161 B1
(45) Date of Patent: Oct. 23, 2001

(54) METHOD OF PURIFYING EXHAUST GAS OF INTERNAL COMBUSTION ENGINE AND APPARATUS THEREOF

(75) Inventors: Toshikatsu Takanohashi, Takanezawa-machi; Hiroshi Oono, Utsunomiya; Osamu Kuroda; Hisao Yamashita, both of Hitachi; Hidehiro Iizuka; Yuichi Kitahara, both of Hitachinaka, all of (JP)

(73) Assignees: Hitachi, Ltd.; Honda Giken Kogyo Kabushiki Kaisha, both of Tokyo (JP)

( * ) Notice: Subject to any disclaimer, the term of this patent is extended or adjusted under 35 U.S.C. 154(b) by 0 days.

(21) Appl. No.: 09/207,600

(22) Filed: Dec. 9, 1998

(30) Foreign Application Priority Data

Dec. 9, 1997 (JP) ...................................... 9-339028

(51) Int. Cl.$^7$ ...................................... F01N 3/10
(52) U.S. Cl. .................. 60/301; 60/297; 60/286; 60/274
(58) Field of Search ............... 60/286, 274, 295, 60/297, 299, 301, 303, 302

(56) References Cited

U.S. PATENT DOCUMENTS

| 5,538,698 | * | 7/1996 | Abe et al. ............................ 422/174 |
| 5,756,057 | * | 5/1998 | Tsuchitani et al. ................. 423/213.2 |
| 5,771,686 | * | 6/1998 | Pischnger et al. ....................... 60/274 |
| 5,972,830 | * | 10/1999 | Yoshida et al. ....................... 502/304 |
| 6,025,297 | * | 2/2000 | Ogura et al. .......................... 502/300 |
| 6,029,441 | * | 2/2000 | Mizuno et al. .......................... 60/274 |

FOREIGN PATENT DOCUMENTS

| 0 625 633 | 11/1994 | (EP) . |
| 0 666 099 | 8/1995 | (EP) . |
| 0 707 882 | 4/1996 | (EP) . |
| 0 786 285 | 7/1997 | (EP) . |
| 62-106826 | 5/1987 | (JP) . |
| 62-117620 | 5/1987 | (JP) . |
| 62-97630 | 5/1987 | (JP) . |
| 2600492 | 1/1997 | (JP) . |

OTHER PUBLICATIONS

Derwent Publications; XP–002117204; (JP 01–79055 (1995)).

* cited by examiner

Primary Examiner—Thomas Denion
Assistant Examiner—Binh Tran
(74) Attorney, Agent, or Firm—Crowell & Moring LLP

(57) ABSTRACT

A method of and apparatus for purifying an exhaust gas of an internal combustion engine comprising an $NO_x$ purifying catalyst arranged in an exhaust gas passage, wherein the $NO_x$ purifying catalyst is made of a composite material containing at least one kind of element selected from alkaline metals and alkaline earth metals, at least one kind of element selected from rare earth metals, at least one kind of element selected from platinoid metals, and titanium (Ti), the $NO_x$ purifying catalyst adsorbing $NO_x$ in the exhaust gas onto the surface when the exhaust gas is lean, and reducing the adsorbed $NO_x$ to $N_2$ when the exhaust gas is stoichiometric or rich, and wherein the exhaust gas is purified by adsorbing $NO_x$ in the exhaust gas in the $NO_x$ purifying catalyst when the internal combustion engine is being operated under a lean condition, and by setting, after the adsorption, the exhaust gas to a stochiometric state or a rich state for 0.5 second to 4.5 seconds to reduce the $NO_x$ adsorbed in said $NO_x$ purifying catalyst to $N_2$ through catalytic reaction with the reducing agent.

9 Claims, 5 Drawing Sheets

METHOD OF PURIFYING EXHAUST GAS OF INTERNAL COMBUSTION ENGINE AND APPARATUS THEREOF

BACKGROUND OF THE INVENTION

The present invention relates to a method of and an apparatus for purifying an exhaust gas discharged from an internal combustion engine such as a vehicle engine and, more particularly, to a method of and apparatus for purifying an exhaust gas discharged from an internal combustion engine capable of operating at a lean air-to-fuel ratio (lean burn) or a vehicle mounting the internal combustion engine capable of operating at a lean air-to-fuel ratio.

Carbon monoxide (CO), hydrocarbon (HC) and nitrogen oxides ($NO_x$) contained in an exhaust gas discharged from an internal combustion engine such as a vehicle engine cause problems in that a harmful influence is affected on human as air pollution materials and plants are inhibited from growing.

Therefore, considerable efforts have been made to reduce an emission amount of the air pollution materials. Fruitful successes have been being attained step-by-step by developing methods of purifying the exhaust gas using a catalyst or the like in addition to reducing a production amount of the air pollution materials by improving combustion methods of an internal combustion engine. In regard to a vehicle mounting a gasoline engine, a main method of rendering the exhaust gas harmless has been that oxidation of HC and CO and deoxidation of $NO_x$ are simultaneously performed using a three way catalyst containing main activation components of Pt, Rh.

An exhaust gas purifying function of the above-mentioned three way catalyst effectively acts only to an exhaust gas generated by burning under a condition near the theoretical air-to-fuel ratio (stoichiometric air-to-fuel ratio) called a window due to its characteristics. Therefore, in the conventional engine, although the air-to-fuel ratio is changed depending on a driving condition of the vehicle, the air-to-fuel ratio has been essentially limited to a changing range near the stoichiometric air-to-fuel ratio (in a case of gasoline, A (amount of air in weight)/F (amount of fuel in weight)=approximately 14.7; hereinafter, the stoichiometric air-to-fuel ratio is represented by A/F=14.7. However, the value varies depending on a kind of the fuel.).

In recent years, a so-called lean burn combustion technology has been developed and it has been not rare to see vehicles having an engine operated under a lean burn condition above an air-to-fuel ratio of 18 because fuel consumption rate can be improved by operating an engine at an air-to-fuel ratio leaner than the stoichiometric air-to-fuel ratio. However, if purifying of the exhaust gas from the lean burn combustion is performed using the three way catalyst used at present as described above, $NO_x$ cannot be effectively purified by reduction though HC and CO can be purified by oxidation.

Accordingly, in order to expand lean burn combustion time (to expand an operating range of applying the lean burn combustion method) by mounting a lean burn combustion engine on a large vehicle, an exhaust gas purifying technology capable of coping with the lean burn combustion is required. Therefore, development of the exhaust gas purifying technologies capable of coping with the lean burn combustion, that is, the technologies of purifying HC, CO, $NO_x$ in an exhaust gas containing a large amount of oxygen ($O_2$), particularly development of the technologies of purifying $NO_x$ are extensively being progressed.

One of the technologies which have been proposed is that $NO_x$ is separated from a lean burn exhaust gas using an $NO_x$ absorbent (at least, separated from $O_2$ in the exhaust gas), and then the $NO_x$ separated by the $NO_x$ absorbent is reduced to $N_2$ to be rendered harmless and the $NO_x$ absorptive capability of the $NO_x$ absorbent is recovered by catalytic reaction of the $NO_x$ with a reducing agent such as a hydrocarbon, carbon monoxide, hydrogen or the like.

For example, in technologies disclosed in Japanese Patent Application-Laid Open No. 62-97630, Japanese Patent Application-Laid Open No. 62-106826 and Japanese Patent Application-Laid Open No. 62-117620, $NO_x$ in an exhaust gas (after NO is converted into $NO_2$ which is easily absorbed) is removed to be absorbed by being brought in contact with a catalyst having an $NO_x$ absorptive capability. When the absorbing efficiency is decreased, the exhaust gas is stopped to pass through the catalyst and the accumulated $NO_x$ is removed by being reduced using a reducing agent such as $H_2$, HC produced from methane, gasoline or the like to recover the $NO_x$ absorptive capability of the catalyst.

On the other hand, in a technology disclosed in Japanese Patent No. 2600492, in an exhaust gas passage of an engine there is provided an $NO_x$ absorbent which can absorb $NO_x$, when the exhaust gas is discharged during lean operation and can discharge the absorbed $NO_x$ when the oxygen concentration in the exhaust gas is decreased. Thereby, $NO_x$ is absorbed when the exhaust gas is discharged during lean operation and the absorbed $NO_x$ is discharged by decreasing the $O_2$ concentration in the exhaust gas flowing into the $NO_x$, absorbent to reduce the $NO_x$ to $N_2$.

The technologies described above have the following problems to be solved.

That is, the first problem is what reducing agent is used for reducing and rendering harmless the $NO_x$ absorbed and captured in the catalyst. Although the merit of a vehicle mounting a lean burn combustion engine is in energy saving based on improvement of fuel consumption rate as described above, using of the reducing agent decreases the improvement of fuel consumption rate. Therefore, an amount of the reducing agent should be minimized as small as possible, and the apparatus and the control for using the reducing agent should be simple and reliable. In addition to these, employing of the system should not deteriorate performance and operability of the vehicle.

Secondary, in the technologies disclosed in Japanese Patent Application-Laid Open No. 62-97630, Japanese Patent Application-Laid Open No. 62-106826 and Japanese Patent Application-Laid Open No. 62-117620 described above, an amount of the reducing agent burnt by $O_2$ in the exhaust gas is suppressed to reduce an amount of the reducing agent in use because the exhaust gas is stopped to pass through the catalyst and the reducing agent such as HC is brought in contact with the $NO_x$ absorbent in order to recover the $NO_x$ absorbent. However, two $NO_x$ absorbent units need to be provided and an exhaust gas switching mechanism for alternately conducting the exhaust gas through the units is also required. Therefore, there is caused a problem in that the structure of the exhaust gas purifying apparatus becomes complex.

Thirdly, in the technology disclosed in Japanese Patent No. 2600492, the exhaust gas is always conducted through the $NO_x$ absorbent, and $NO_x$ is absorbed when the exhaust gas is discharged under a lean burn condition and the absorbed $NO_x$ is discharged to recover the absorbent by decreasing the $O_2$ concentration in the exhaust gas (combustion under a rich burn condition). Therefore, switching of the gas flow is not necessary and accordingly the above second problem can be solved.

However, it is based on the premise that the material is employed as the catalyst, which material can absorb $NO_x$ when the exhaust gas is discharged during lean operation and can discharge the absorbed $NO_x$ when the oxygen concentration in the exhaust gas is decreased. The above-mentioned technology discloses a means for discharging the exhaust gas under combustion in a rich burn condition when the discharged $NO_x$ is reduced. However, in order to actually mount the above-mentioned means on the vehicle, it is necessary to optimize the condition in the rich combustion, taking into consideration the fuel economy (fuel consumption rate), the operability, the driveability, the reliability and so on. Therefore, from the standpoint of optimization of the fuel economy, the problem is how the amount of fuel consumed in the rich combustion is decreased. In addition to this, the optimization closely relates to the characteristic of the $NO_x$ absorbent, and accordingly selection of the $NO_x$ absorbent is also one of the important elements.

SUMMARY OF THE INVENTION

The present invention is to solve the above-mentioned problems.

An object of the present invention is to provide a method and an apparatus of purifying an exhaust gas of a lean burn combustion internal combustion engine which can effectively remove harmful components such as $NO_x$ or the like from the exhaust gas to render the harmful components harmless, with the fuel economy suppressed to decrease.

Particularly, the object of the present invention is to provide a method and an apparatus of purifying an exhaust gas in which the constitution of the purifying method and the purifying apparatus is simple and an amount of the consumed reducing agent is small, and $NO_x$ is reduced to $N_2$ to be rendered harmless by separating $NO_x$ from the lean exhaust gas using an $NO_x$ adsorbent and then bring the $NO_x$, separated by the adsorbent into contact with a stoichiometric or rich exhaust gas, wherein the method and the apparatus of purifying an exhaust gas are capable of realizing an lean burn combustion internal combustion engine excellent in both of the exhaust gas purifying performance and the fuel consumption rate.

In order to attain the above-mentioned object, a method of purifying an exhaust gas of an internal combustion engine in accordance with the present invention is characterized in that an $NO_x$ purifying catalyst is arranged in an exhaust gas passage, and the $NO_x$ purifying catalyst is made of a composition containing at least one kind of element selected from the group consisting of alkaline metals and alkaline earth metals, at least one kind of element selected from the group consisting of rear earth metals, at least one kind of element selected from the group consisting of platinoid metals (so-called noble metals), and titanium (Ti), and the $NO_x$ purifying catalyst adsorbs $NO_x$ in the exhaust gas onto the surface when the exhaust gas is lean, the $NO_x$ purifying catalyst reducing the adsorbed $NO_x$ to $N_2$ when the exhaust gas is stoichiometric or rich, wherein the exhaust gas is purified by adsorbing $NO_x$ in the exhaust gas in the $NO_x$ purifying catalyst when the internal combustion engine is being operated under a lean condition, and then the exhaust gas is set to a stoichiometric state or a rich state for 0.5 second to 4.5 seconds thereby to reduce the $NO_x$ adsorbed in the $NO_x$ purifying catalyst to $N_2$ through catalytic reaction with the reducing agent.

The method of purifying an exhaust gas of an internal combustion engine in accordance with the present invention constructed as described above can render the exhaust gas harmless and effectively purify $NO_x$ and so on in the exhaust gas under lean burn combustion without affecting the fuel consumption rate so much by adsorbing and capturing $NO_x$ in the exhaust gas when the exhaust gas is lean (a stoichiometric amount of oxidizing agent in the exhaust gas is larger than that of reducing agent present in the exhaust gas for reducing NOx), and by reducing the adsorbed and captured $NO_x$ to $N_2$ when the exhaust gas is stoichiometric (an amount of oxidizer is equal to an amount of reducing agent) or rich (an amount of reducing agent is equal to or larger than an amount of oxidizer), that is, by adsorbing $NO_x$ in the exhaust gas onto the $NO_x$ purifying catalyst when the internal combustion engine is being operated under a lean condition, and by bringing, after the adsorption, the exhaust gas to a stoichiometric state or a rich state for 0.5 second to 4.5 seconds to reduce the $NO_x$ adsorbed in the $NO_x$ purifying catalyst to $N_2$ through catalytic reaction with the reducing agent.

Here, the oxidizer is $O_2$, NO, $NO_2$ and so on, and mainly oxygen. The reducing agent is HC supplied to the internal combustion engine, and HC (including hydrocarbons containing oxygen), CO, $H_2$ and so on as by-products produced in the combustion process.

A preferred aspect of the present invention is characterized in that the $NO_x$ purifying catalyst is made of a composition comprising at least one kind of element selected from potassium (K) and sodium (Na) of alkaline metal and magnesium (Mg), calcium (Ca) and strontium (Sr) of the alkaline earth metal, at least one kind of element selected from lanthanum (La) and cerium (Ce) of the rare earth metal, at least one kind of element selected from platinum (Pt), rhodium (Rh) and palladium (Pd) of the platinoid metal (so-called noble metal), and titanium (Ti); and that a composition is used in which the composition is supported on a heat resistant porous metal oxide.

Another preferred aspect of the present invention is characterized in that in the stoichiometric state or the rich state, a depth of the rich state is between 13.0 to 14.7 by air-to-fuel ratio A/F.

Further, an apparatus for performing the method of purifying an exhaust gas of an internal combustion engine in accordance with the present invention is characterized in that the apparatus for performing the method of purifying an exhaust gas of an internal combustion engine comprises an $NO_x$ purifying catalyst arranged in an exhaust gas passage and a control unit, wherein the control unit has an air-to-fuel ratio control means, the air-to-fuel ratio control means having a means for controlling the exhaust gas to a stoichiometric state or a rich state for 0.5 second to 4.5 seconds in order to purify the exhaust gas by reducing the $NO_x$ adsorbed in the $NO_x$ purifying catalyst to $N_2$ through catalytic reaction with a reducing agent when the internal combustion engine is being operated under a lean condition, and in the control of the exhaust gas to a stoichiometric state or a rich state, a depth of the rich state is between 13.0 to 14.7 by air-to-fuel ratio A/F.

As described above, in the method of and apparatus for purifying the exhaust gas of the internal combustion engine in accordance with the present invention, the stoichiometric exhaust gas or the rich exhaust gas is generated by setting the combustion condition of the internal combustion engine to the condition of the stoichiometric air-to-fuel ratio or the condition of fuel excess (rich). This condition can be made by a method of forming a condition in which an amount of reducing agent in the composition of the mixed exhaust gas from all the cylinders is equal to (corresponding to a stoichiometric exhaust gas) or larger than (corresponding to a rich exhaust gas) an amount of oxidizer in the oxidation-reduction stoichiometric relationship by controlling a fuel injection rate corresponding to an output of an oxygen concentration sensor provided in the exhaust gas duct and an output of an intake air flow sensor using the above-mentioned air-to-fuel ratio control means, by a method of forming the condition of stoichiometric air-to-fuel ratio or the rich condition by throttling the intake air flow rate using a DBW, or by a method of forming the condition of stoichiometric air-to-fuel ratio or the rich condition by introducing an inert gas of the EGR.

The $NO_x$ purifying catalyst in accordance with the present invention may be used in various kinds of shapes, from a honeycomb shape which can be obtained by coating a honeycomb shaped structure made of cordierite or a metallic material such as stainless steel with the adsorptive catalytic component down to a pellet shape, a plate shape, a granular shape and powder.

In the method of purifying the exhaust gas of the internal combustion engine and the apparatus for purifying the exhaust gas in accordance with the present invention, the timing to generate the stoichiometric exhaust gas or the rich exhaust gas can be determined by each of the following methods.

Firstly, an $NO_x$ exhausting amount during lean operation is estimated from an air-to-fuel ratio setting signal determined by an engine control unit, an engine rotating speed signal, an intake air flow rate signal, an intake air pipe pressure signal, a speed signal, a throttle opening, an exhaust gas temperature and so on, and the time when an accumulative value of the $NO_x$ exhausting amount exceeds a set value is set as the timing to generate the stoichiometric exhaust gas or the rich exhaust gas.

Secondary, an accumulative amount of oxygen is detected using a signal of an oxygen sensor (or an A/F sensor) placed at a position upstream or downstream of an $NO_x$ purifying catalyst arranged in the exhaust gas passage, and the time when an accumulating value of the accumulative amount of oxygen exceeds a set value is set as the timing to generate the stoichiometric exhaust gas or the rich exhaust gas. In a modification of this method, the time when an accumulative amount of oxygen during lean operation exceeds a set value is set as the timing to generate the stoichiometric exhaust gas or the rich exhaust gas.

Thirdly, an accumulative amount of $NO_x$ is calculated using a signal from an $NO_x$ sensor placed at a position upstream of an $NO_x$ purifying catalyst arranged in the exhaust gas passage, and the time when the accumulative amount of $NO_x$ during lean operation exceeds a set value is set as the timing to generate the stoichiometric exhaust gas or the rich exhaust gas.

Fourthly, an $NO_x$ concentration during lean operation is detected using a signal from an $NO_x$ sensor placed at a position downstream of an $NO_x$ purifying catalyst arranged in the exhaust gas passage, and the time when the $NO_x$ concentration exceeds a set concentration is set as the timing to generate the stoichiometric exhaust gas or the rich exhaust gas.

Further, in the method of purifying the exhaust gas or the apparatus for purifying the exhaust gas in accordance with the present invention, the time period during which an amount of the reducing agent is kept equal to or larger than an amount of the oxidizing agent or an amount of the reducing agent injected in order to keep an amount of the reducing agent equal to or larger than an amount of the oxidizing agent is realized by adjusting a stroke of a fuel injection valve, an injection time period and an injection interval.

DESCRIPTION OF SYMBOLS

1 . . . air cleaner, 2 . . . air flow sensor, 3 . . . throttle valve, 4 . . . throttle opening degree sensor, 5 . . . injector, 6 . . . ignition plug, 7 . . . accelerator pedal, 8 . . . load sensor, 9 . . . intake air temperature sensor, 11 . . . intake pipe, 12 . . . fuel pump, 13 . . . fuel tank, 18 . . . exhaust pipe, 19 . . . $NO_x$ purifying catalyst, 20 . . . oxygen sensor, 21 . . . $NO_x$ concentration sensor, 22 . . . $NO_x$ purifying catalyst, temperature sensor, 23 . . . exhaust gas temperature sensor, 24 . . . manifold catalyst, 25 . . . control unit (ECU), 26 . . . knock sensor, 28 . . . water temperature sensor, 29 . . . crank angle sensor, 99 . . . engine.

DESCRIPTION OF EMBODIMENTS OF THE INVENTION

An embodiment of a method of purifying the exhaust gas of an internal combustion engine and an apparatus for purifying the exhaust gas in accordance with the present invention will be described below, referring to drawings.

APPARATUS FOR PURIFYING AN EXHAUST GAS

Figure 1:
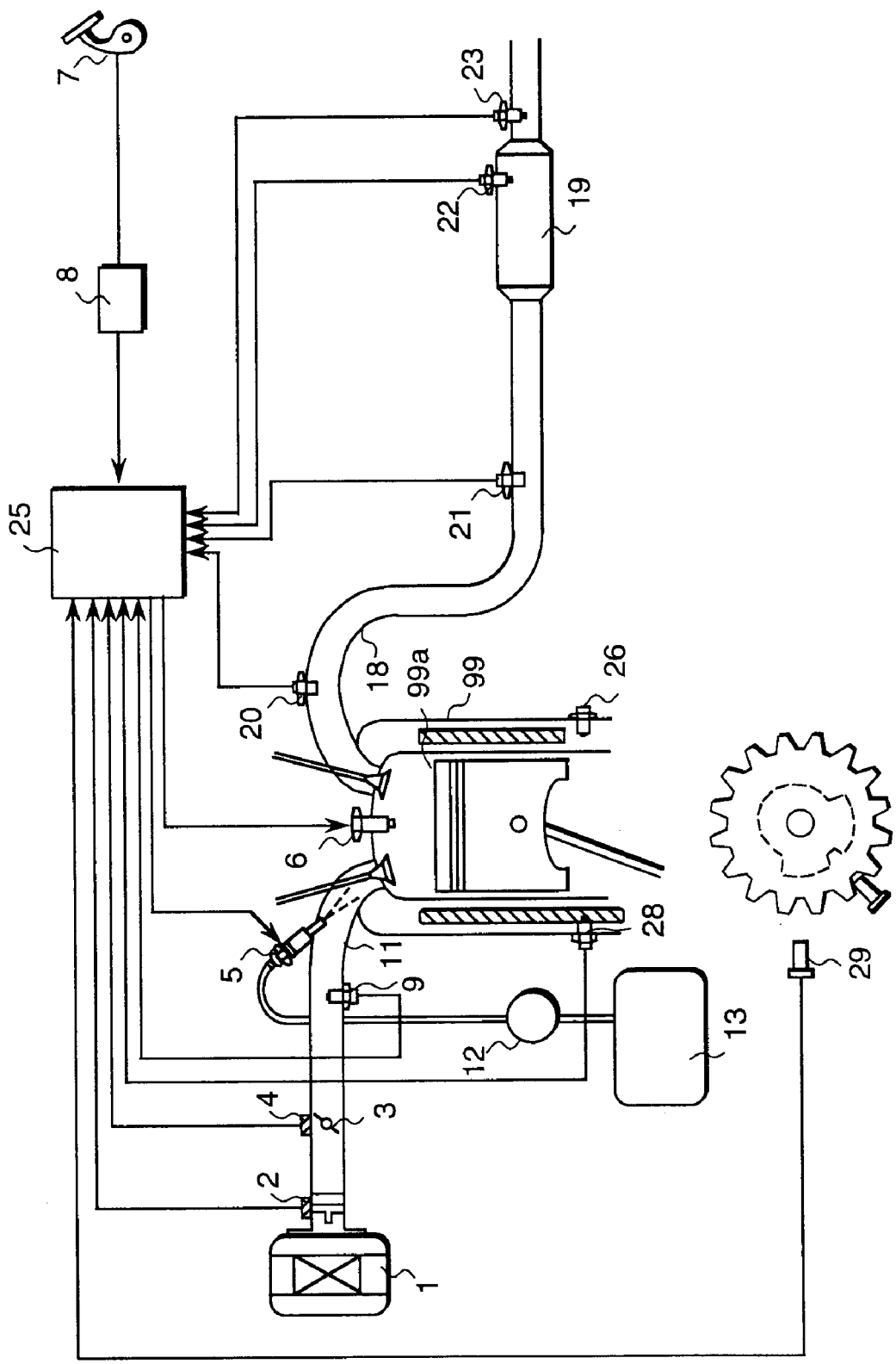
FIG. 1 is a diagram showing the overall construction of an embodiment of an internal combustion engine unit including an apparatus of purifying an exhaust gas in accordance with the present invention.

FIG. 1 is a diagram showing the overall construction of an internal combustion engine unit including an apparatus of purifying an exhaust gas of the present embodiment.

The internal combustion engine unit in accordance with the present invention is composed of an engine 99 capable of performing lean burn operation, an air intake system having an air cleaner 1, a throttle valve 3, an air intake pipe 11 and so on, an exhaust gas purifying system having an exhaust gas pipe 18, an $NO_x$ purifying catalyst 19 and so on, and a control unit (ECU) 25. The control unit 25 is composed of, not shown in the figure, an I/O LSI as an input-output interface, a micro-processing unit MPU, memory units RAM and ROM for storing a plurality of control programs, a timer counter and so on. Fuel in a fuel tank 13 is conducted to an injector 5 arranged in the air intake system of the engine through a fuel pump 12.

An air flow sensor 2, a throttle opening sensor 4 and an intake air temperature sensor 9 are arranged in the air intake system, and an output signal of each of the sensors is input to the control unit 25. An oxygen sensor 20, an $NO_x$ concentration sensor 21, an $NO_x$ purifying catalyst temperature sensor 22 and an exhaust gas temperature sensor 23 are arranged in the exhaust gas purifying system, and an output signal of each of the sensors is also input to the control unit 25. Further, output signals of a knock sensor 26, a water temperature sensor 28, a crank angle sensor 29 for detecting a rotating speed of the engine 99 and a load sensor 8 for detecting an engine load based on a stepping amount of an accelerator pedal 7 are also input to the control unit 25.

In the internal combustion engine unit having the exhaust gas purifying apparatus provided thereon, the intake air to the engine 99 is measured by the air flow sensor 2 after being filtered by the air cleaner 1, and is supplied to the air intake pipe 11 through the throttle valve 3, and becomes a mixed gas by receiving fuel injected from the injector 5 to be supplied to the engine 99.

The control unit 25 evaluates an operating state of the internal combustion engine 99 and a state of the $NO_x$ purifying catalyst 19 based on the signals of the sensors described above and determines an operating air-to-fuel ratio using an air-to-fuel ratio control means (not shown in the figure), and controls the fuel concentration of the mixed gas so as to set the fuel concentration to a desired value by controlling an injection time period of the injector 5 and so on. The mixed gas sucked in a combustion chamber 99a is fired and burned by an ignition plug 6 controlled by a signal from the control unit 25.

The exhaust gas burned in the engine 99, in which the embodiment of the exhaust gas purifying apparatus in accordance with the present invention is composed, is conducted to the exhaust gas purifying system described above. Since the $NO_x$ purifying catalyst 19 is provided in the exhaust gas purifying system, $NO_x$, HC, CO in the exhaust gas are purified by the three way catalytic function of the $NO_x$ purifying catalyst during stoichiometric operation, and during lean operation $NO_x$ is purified by the $NO_x$ capturing capability (adsorbing capability) and at the same time HC and CO are purified by the burning capability which the $NO_x$ purifying catalyst also has.

Further, during lean operation the $NO_x$ purifying capability of the $NO_x$ purifying catalyst is judged by a control judgment and a control signal of the aforementioned air-to-fuel ratio control means. When the $NO_x$ adsorbing-capturing capability is decreased, the $NO_x$ adsorbing-capturing capability of the $NO_x$ purifying catalyst 19 is recovered by controlling the air-to-fuel ratio for combustion so as to become stoichiometric or rich. By controlling so as to repeat the above-mentioned operation, the apparatus of the embodiment can effectively purify the exhaust gas under all the conditions of combustion operations of the engine, including lean operation and stoichiometric (including rich) operation.

$NO_x$ Purifying Catalyst $NO_x$ purifying catalysts 19 suitable for the present embodiment are an $NO_x$ purifying catalyst N—N and an $NO_x$ purifying catalyst N—S which were used in the characteristic evaluation to be described later, and the $NO_x$ purifying catalysts were prepared through the following method.

The $NO_x$ purifying catalyst N—N was prepared through the following method. That is, a honeycomb made of cordierite as a base body of the honeycomb catalyst was coated with alumina of 150 g per 1 L apparent volume. A honeycomb shaped catalyst was obtained by supporting catalytic active components onto the alumina coated honeycomb. The alumina coated honeycomb was firstly impregnated with a solution of cerium nitrate ($Ce(NO_3)_2$) 19 and calcined for 1 hour at 600° C. after being dried, and then impregnated with a mixed solution of a solution of sodium nitrate ($NaNO_3$), a solution of titania-sol and a solution of magnesium nitrate ($Mg(NO_3)_2$), and also dried and calcined.

Further, the alumina coated honeycomb was impregnated with a mixed solution of a solution of dinitrodiamine platinum nitrate and a solution of rhodium nitrate ($Rh(NO_3)_2$), and calcined for 1 hour at 450° C. after being dried. Finally, the alumina coated honeycomb was impregnated with a solution of magnesium nitrate, and calcined for 1 hour at 450° C. after being dried. Through the above process, the honeycomb shaped $NO_x$ purifying catalyst, 2Mg-(0.2Rh, 2.7Pt)-(18Na, 4Ti, 2Mg)-27Ce/$Al_2O_3$ which had Ce, Mg, Na, Ti, Rh, Pt supported on the alumina ($Al_2O_3$) was obtained.

Therein, $Al_2O_3$ indicates that the active components are supported on the $Al_2O_3$, and the numeral before each of the element symbols indicates a weight (g) of the indicated metal component supported per 1 L of the honeycomb apparent volume. The order of description indicates the order of supporting, that is, the supporting was effected in the order of description from the component near the $Al_2O_3$ to the component apart from the $Al_2O_3$ in turn. The components in parentheses were supported at the same time.

The $NO_x$ purifying catalyst N—S was prepared through the following method, as described above. A solution of strontium nitrate ($Sr(NO_3)_2$) was used instead of the solution of sodium nitrate in the $NO_x$ purifying catalyst N—N, and the honeycomb shaped $NO_x$ purifying catalyst N—S, 2Mg-(0.2Rh, 2.7Pt)-(22.5Sr, 9Ti)-27Ce/$Al_2O_3$ was obtained through a method similar to the method in the $NO_x$ purifying catalyst N—N.

$NO_x$ Purifying Characteristics

Purifying characteristics of exhaust gas of a vehicle mounting the exhaust gas purifying apparatus of the embodiment in accordance with the present invention and the fuel consumption rates will be described below.

The $NO_x$ purifying catalyst N—N obtained through the catalyst preparation method described above was heat-treated under an oxidation atmosphere at 700° C. for 100 hours, and then the exhaust gas purifying characteristic and the fuel consumption rate were evaluated by the following means.

A honeycomb shaped $NO_x$ purifying catalyst of 1.24 L (400 cells/$in^2$) volume prepared by the above-mentioned method was placed under a floor of a vehicle mounting a lean burn designed gasoline engine of 1.6 L displacement volume, and the vehicle was run on a chassis dynamometer. Analysis of exhaust gas was performed using a vehicle exhaust gas measuring equipment, and a CVS (constant volume sampling) value was obtained by sampling the exhaust gas using a vehicle constant volume sampling equipment. A fuel consumption rate was calculated from a driving distance and a carbon balance.

Running was performed under the 10-15 mode. Lean operation was performed for all normal running, for running of vehicle speed above 50 km/h in 15 mode second ascending acceleration range and for running of vehicle speed above 55 km/h in 15 mode third ascending acceleration range, and stoichiometric operation was performed for the other running modes. The $NO_x$ capturing capability was estimated during the lean operation using an $NO_x$ capturing capability estimating means. When a value of the $NO_x$ capturing capability became below a preset value predetermined by taking the catalyst characteristics into consideration, a short time stoichiometric or rich operation (rich shift) was inserted. Effects on an amount of emission of harmful substances such as $NO_x$ and a fuel consumption rate (km/L) were evaluated with varying stoichiometric or rich depth (A/F value) and time period of rich shift. The depth of rich shift and the time period holding rich shift were kept constant within one 10-15 mode running test.

Figure 2:
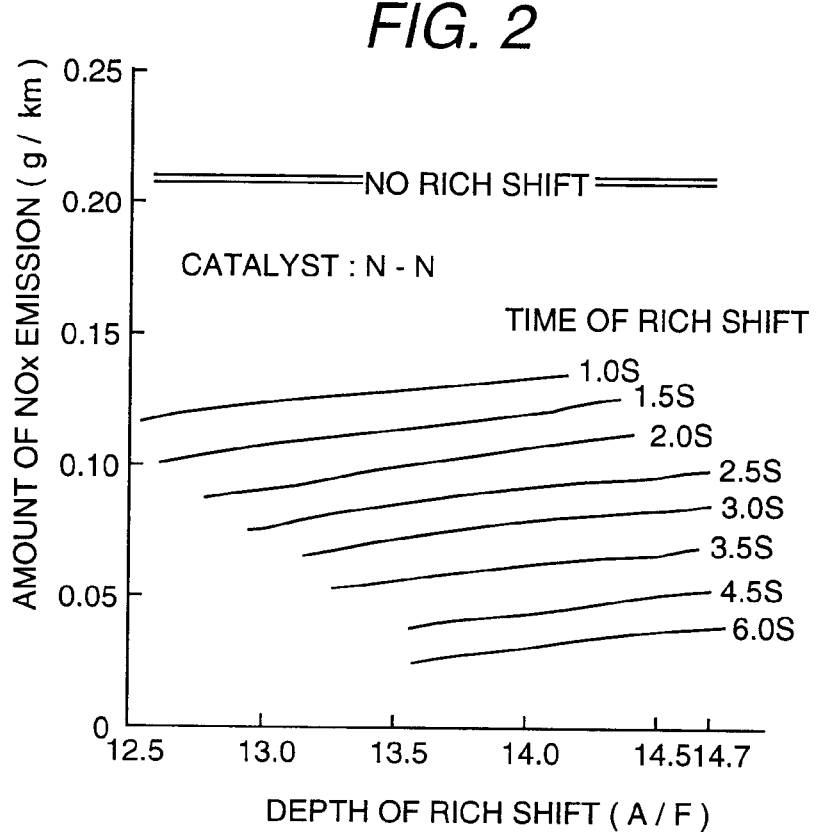
FIG. 2 is a diagram showing the relationship among amount of exhausting $NO_x$, depth of rich shift (value of A/F) and time of rich shift in a case where the rich shift is inserted during lean operation in the apparatus of purifying an exhaust gas of FIG. 1.

Effects of the depth of rich shift (A/F value) and the time period of rich shift on the amount of $NO_x$ exhaust obtained under the above-mentioned condition are shown in FIG. 2. It can be understood from FIG. 2 that the amount of $NO_x$ exhaust is strongly affected by the time period of rich shift and decreased as the time period of rich shift is longer, and that the amount of $NO_x$ exhaust is decreased as the degree of rich is increased (the A/F value is decreased) but the degree of decreasing $NO_x$ exhaust is not so large.

Figure 3:
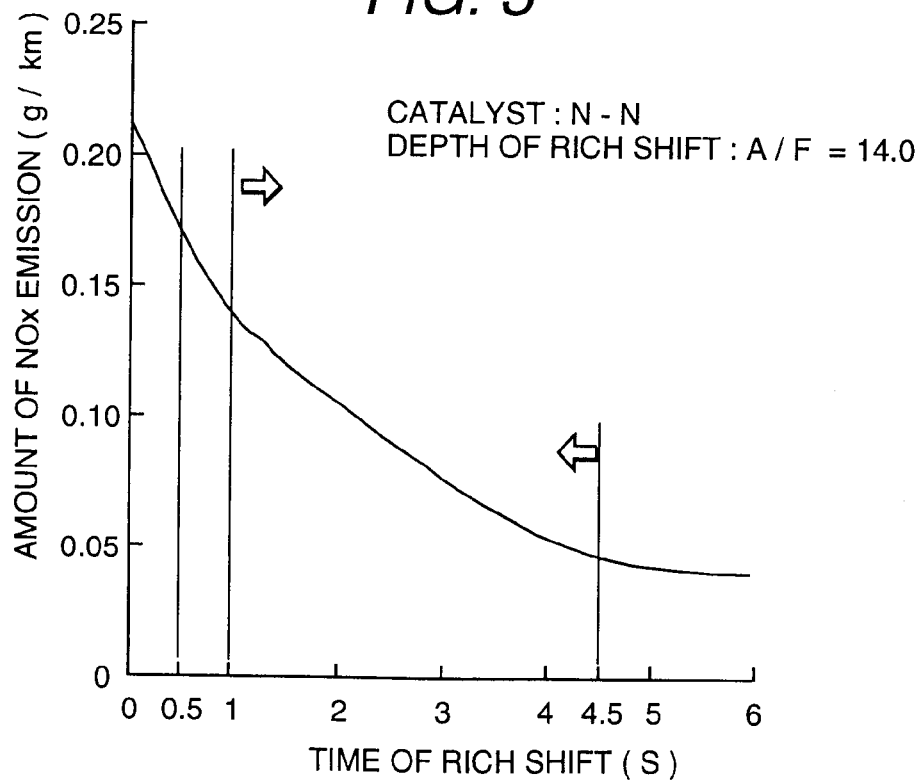
FIG. 3 is a diagram showing the relationship between time period of rich shift and amount of $NO_x$ exhaust during rich shift when a value of A/F is 14.0 in the apparatus of purifying an exhaust gas of FIG. 1.

FIG. 3 is a diagram showing the relationship between the time period of rich shift and the amount of $NO_x$ exhaust when the value of A/F is 14.0. It can be understood from FIG. 3 that a required rich shift time period is at least 0.5 second, preferably, 1 second in order to obtain a sufficient effect of reducing an amount of $NO_x$ exhaust, and that in a case where a rich shift time period is longer than 4.5 seconds, the ratio of reducing an amount of $NO_x$ exhaust becomes small and a sufficient effect of reducing an amount of $NO_x$ exhaust cannot be exerted. That is, it can be understood that the rich shift in a range between 0.5 second to 4.5 seconds is effective for reducing an amount of $NO_x$ exhaust.

Figure 4:
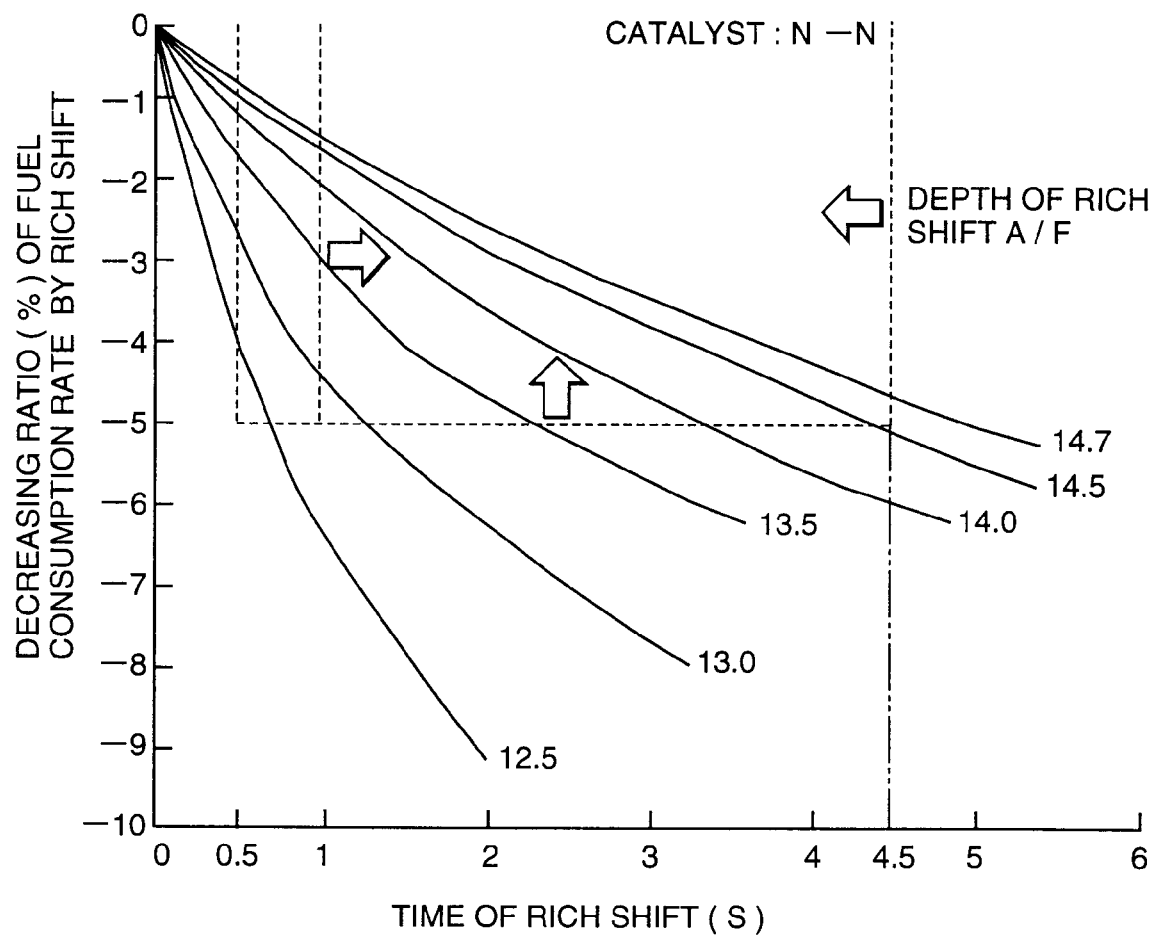
FIG. 4 is a diagram showing the relationship between ratio of decreasing fuel consumption rate, time period of rich shift and depth of rich shift (A/F) during rich shift in the apparatus of purifying an exhaust gas of FIG. 1.

FIG. 4 is a diagram showing the relationship between ratio of decrease in fuel consumption rate, time period of rich shift and depth of rich shift (A/F) during rich shift under a test condition similar to the above-mentioned test condition. As the ratio of decreasing fuel consumption rate, there is used a value calculated from the following equation (1).

A ratio of decreasing a fuel consumption rate (%) =(fuel consumption rate with rich shift−fuel consumption rate without rich shift)/(fuel consumption rate without rich shift)×100 (1) where fuel consumption rate : km/L: 10-15 mode.

What can be understood from FIG. 4 is that the fuel consumption rate naturally decreases, as the time period of rich shift becomes longer and the depth of rich shift becomes deeper (the A/F value becomes smaller). As described above, it is preferable that the rich shift is shallower since the effect of decreasing an amount of $NO_x$ exhausted is small. The ratio of reducing fuel consumption rate of a vehicle employing lean burn system is generally 10% or more. Taking this into consideration, it can be said that the ratio of decreases in the fuel consumption rate by the rich shift should be suppressed to 5% or less.

It can be understood from FIG. 4 that the depth of rich shift which satisfies the condition of the ratio of decreasing the fuel consumption rate within 5% and the time period of rich shift within the above-mentioned range between 0.5 second and 4.5 seconds is an A/F value range between 12.5 and 14.7, preferably between 13 and 14.7.

The above description has discussed only $NO_x$ as the harmful substance in the exhaust gas. However, an amount of CO and HC exhausted is very small, and an amount increased due to the rich shift is very small and does not affect the amount of CO and HC exhausted so much.

Figure 5:
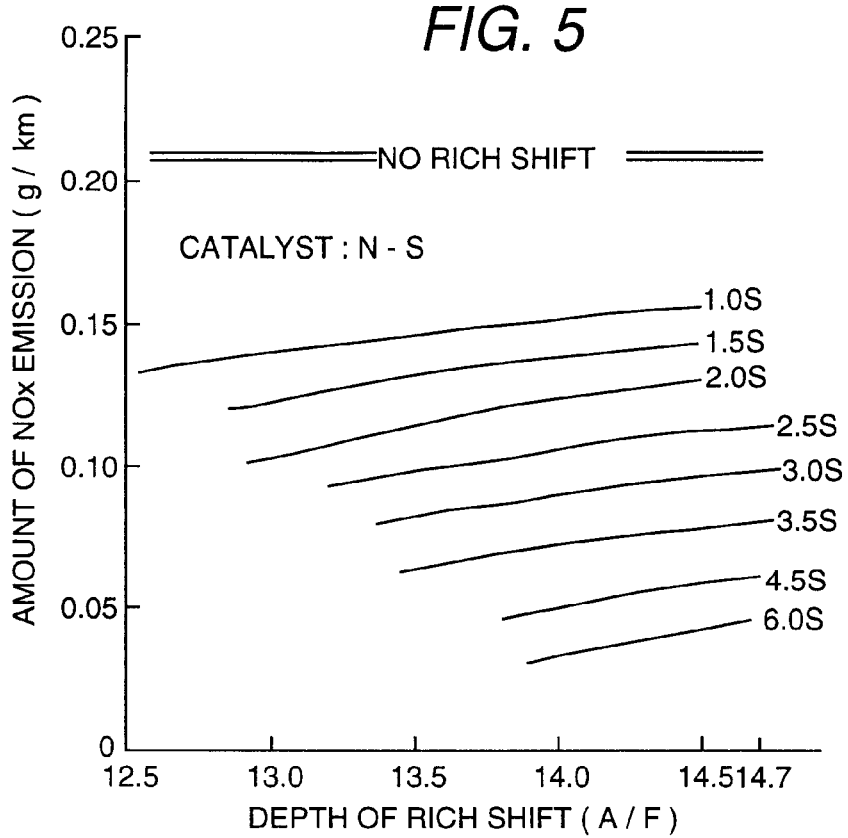
FIG. 5 is a diagram showing the relationship among amount of exhausting $NO_x$, depth of rich shift (value of A/F) and time of rich shift in a case where the rich shift is inserted during lean operation in the apparatus of purifying an exhaust gas of FIG. 1.

Next, in regard to the $NO_x$ purifying catalyst N—S, amounts of harmful substance exhaust and fuel efficiencies were measured using the same means as in the case of the $NO_x$ purifying catalyst N—N. The correlation among the amount of $NO_x$ exhaust, the depth of rich shift (A/F value) and the time period of rich shift shown in FIG. 5 was found under the same test condition as in the case of the $NO_x$ purifying catalyst N—N. Similarly to in FIG. 2, it can be understood that the amount of $NO_x$ exhaust is strongly affected by the time period of rich shift and decreased as the time period of rich shift becomes longer. Further, the amount of $NO_x$ exhaust is decreased as the degree of rich is increased (the A/F value is decreased) but the degree of decreasing $NO_x$ exhaust is small.

Figure 6:
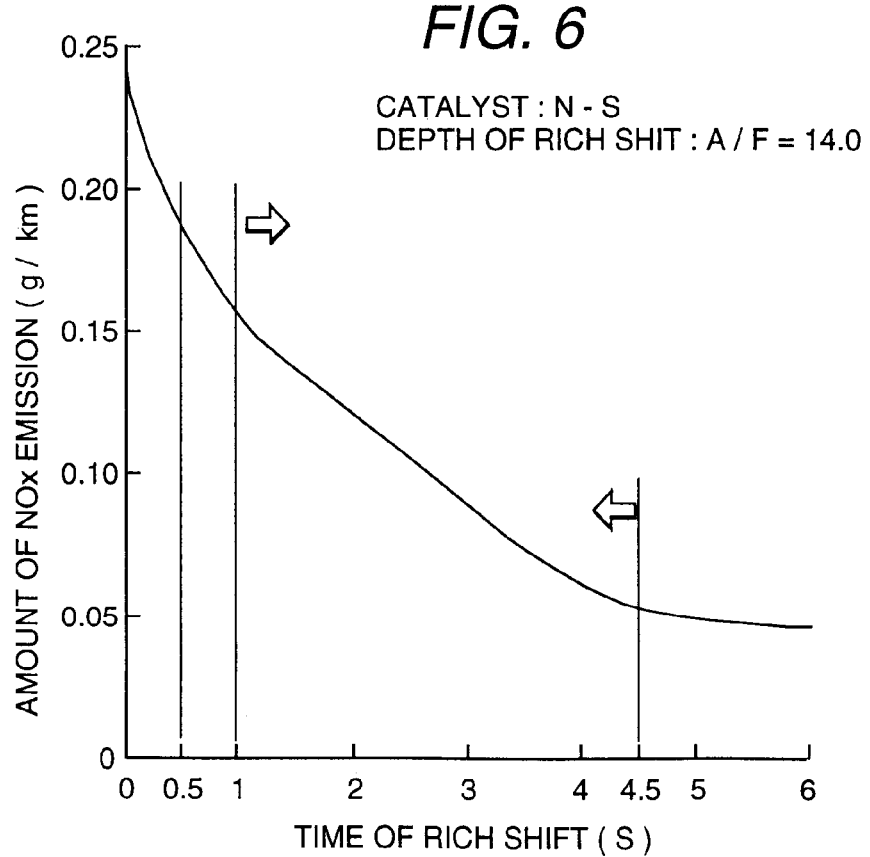
FIG. 6 is a diagram showing the relationship between time of rich shift and amount of exhausting NO during rich shift when a value of A/F is 14.0 in the apparatus of purifying an exhaust gas of FIG. 1.

FIG. 6 is a diagram showing the relationship between the time period of rich shift and amounts of $NO_x$ exhausted when the value of A/F is 14.0. Similarly to the case of the $NO_x$ purifying catalyst N—N in FIG. 3, it can be understood that a required rich shift time period is at least 0.5 second, preferably, 1 second in order to obtain a sufficient effect of reducing an amount of $NO_x$ exhausted, and that in a case where a rich shift time period is longer than 4.5 seconds, the ratio of reducing an amount of $NO_x$ exhausted becomes small and a sufficient effect of reducing an amount of $NO_x$ exhausted cannot be exerted. That is, it can be understood that in this catalyst the rich shift in a range between 0.5 second to 4.5 seconds is also effective from the viewpoint of reducing an amount of $NO_x$ exhausted. Therefore, it can be said from the result together with the relationship of the rich shift condition and the decreasing ratio of fuel consumption in FIG. 4 that the effective depth of rich shift is in an A/F value range between 14.7 and 12.5, preferably between 14.7 and 13.0.

In the case of this lean $NO_x$ purifying catalyst, also, an amount of CO and HC exhaust was very small, and an increase in the amount due to the rich shift was very small and did not affect the amount of CO and HC exhausted so much.

The feature of the present embodiments is mainly characterized by that the characteristic of the $NO_x$ purifying catalysts in the embodiments, particularly, the characteristic of reducing the amount of $NO_x$ exhaust is affected by the time period of rich shift and is not affected by the depth of rich shift so much. It can be considered that this characteristic relates to the characteristic to be described below of the $NO_x$ purifying catalyst in the embodiment.

The $NO_x$ purifying catalyst in the embodiment of the exhaust purifying apparatus reduces and purifys $NO_x$ in the lean exhaust gas, and purifys $NO_x$ by capturing the $NO_x$ in the catalyst. The captured $NO_x$ is performed mainly by adsorption on the surface of the catalyst. When the adsorbed and captured $NO_x$ is brought in contact with the stoichiometric or rich exhaust gas, the adsorbed and captured $NO_x$ is reduced to $N_2$ on the catalyst by the reducing agent such as HC (hydrocarbon), CO (carbon monoxide) and so on to recover the $NO_x$ adsorbing capability of the surface of the catalyst. Reduction of $NO_x$ in adsorbed state progresses fast. This is because the mass transfer step accompanied by the reduction reaction of adsorbed $NO_x$ includes only a vapor phase diffusion step of the reducing agent and produced $N_2$ and a surface diffusion step of the adsorbed $NO_x$ and does not include any mass transfer step inside the catalyst bulk which is large in mass transfer resistance.

If the $NO_x$ is absorbed inside the catalyst bulk, the $NO_x$ needs to move up to the surface of the catalyst by diffusion or the reducing agent needs to move into the catalyst bulk by diffusion. In order to increase the transfer velocity inside the bulk, a concentration difference is required as a motive force, and accordingly the concentration of the reducing agent needs to be increased. That is, the rich shift needs to be deepened. Further, since the transfer speed of the substance such as $NO_x$ inside the bulk is small (because the portion where the reducing agent in the rich shift gas exists does not contribute to the reaction and the reducing agent passes through on the catalyst), an availability of the reducing agent becomes small.

The $NO_x$ purifying catalyst in the embodiment of the exhaust gas purifying apparatus does not require to deepen the rich shift, but requires time for supplying the necessary reducing agent. That is, the depth of rich shift does not relate to decreasing of the amount of $NO_x$ exhaust so much, but the time period of rich shift relates to decreasing of the amount of $NO_x$ exhaust. Furthermore, in the $NO_x$ purifying catalyst in the embodiment of the exhaust gas purifying apparatus, the decrease in fuel consumption rate due to the rich shift is small because shallow rich shift is sufficient for recovering the catalyst.

Figure 7:
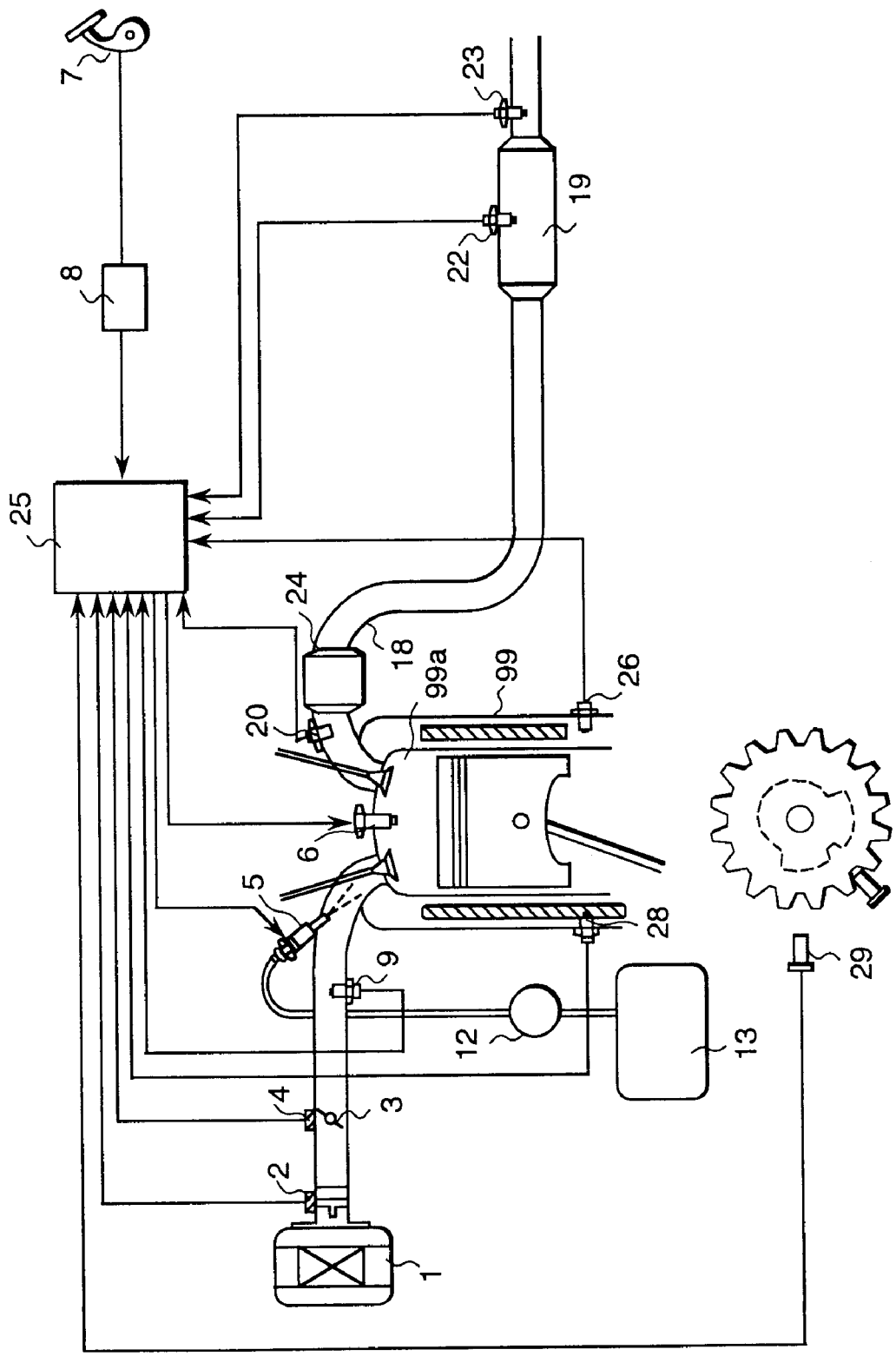
FIG. 7 is a diagram showing the overall construction of another embodiment of an internal combustion engine unit including an apparatus of purifying an exhaust gas in accordance with the present invention in which a manifold catalyst is arranged in the exhaust purifying system.

FIG. 7 shows another embodiment of an internal combustion engine unit including an apparatus of purifying an exhaust gas in accordance with the present invention. A different point of this embodiment from the embodiment of FIG. 1 is that a manifold catalyst 24 is arranged in the duct of the exhaust pipe near the engine.

Strengthening of the exhaust regulation to the exhaust gas of vehicles requires to purifying harmful substances such as HC and the like which are discharged just after starting of the engine. That is, in the past, the exhaust gas has been discharged without being purified until the catalyst is heated up to an operating temperature. However, it is necessary to substantially decrease the amount of the harmful substance discharged just after starting. In order to solve the problem, a method of rapidly heating the catalyst up to the operating temperature is effective. FIG. 7 shows a system construction which is capable of reducing amounts of HC, CO discharged at engine starting and capable of coping with the exhaust gas purifying during lean and stoichiometric (including rich) operations.

In the construction of FIG. 7, a catalyst having Pt, Rh, $CeO_2$ as main components, that is, a so-called three way catalyst and a three way catalyst added with Pd, or a combustion catalyst having a combustion active component such as Pd or the like as a main component can be employed. In the construction of the embodiment, the manifold catalyst 24 is heated in a short time at starting to perform purifying of HC and CO just after the starting, and both of the manifold catalyst 24 and the $NO_x$ purifying catalyst 19 are functioning during stoichiometric operation to purify NC, CO and $NO_x$, and the $NO_x$ purifying catalyst 19 adsorbs and purifys $NO_x$ during lean operation. When the air-to-fuel ratio is rich shifted in order to recover the $NO_x$ capturing capability of the $NO_x$ purifying catalyst, HC and CO as the reducing agents reach the $NO_x$ purifying catalyst without being chemically changed by the manifold catalyst to recover the $NO_x$ capturing capability.

Although the two embodiments have been described in detail, it is understood that the present invention is not limited to the embodiments and that various changes in design may be resorted to without departing from the spirit of the invention described in the claims.

For example, an engine of direct injection type may be employed instead of the engine 99 of FIG. 1, and a combustion catalyst as a post-catalyst may be arranged at a position downstream of the NO purifying catalyst 19 of FIG. 1 to form an apparatus which is improved in HC purifying capability. Further, a three way catalyst may be arranged instead of the above combustion catalyst to form an apparatus which is strengthened in the three way catalytic function during stoichiometric operation.

As can be understood from the above description, the method of purifying the exhaust gas of an internal combustion engine and the apparatus for purifying the exhaust gas of an internal combustion engine in accordance with the present invention can effectively purify $NO_x$ and so on in the exhaust gas of lean burn combustion without affecting the fuel consumption rate so much by placing the $NO_x$ purifying catalyst having the specific function in the exhaust gas passage, by adsorbing and capturing $NO_x$ in an oxidation atmosphere of the exhaust gas in the lean operating range of the internal combustion engine, and by generating a reducing atmosphere to recover the $NO_x$ purifying catalyst.

What is claimed is:

1. A method of purifying an exhaust gas of an internal combustion engine comprising an $NO_x$ purifying catalyst arranged in an exhaust gas passage, wherein said $NO_x$ purifying catalyst is made of a composition consisting of at least one kind of element selected from the group consisting of rare earth metals, at least one kind of element selected from the group consisting of alkaline metals and alkaline earth metals, at least one kind of element selected from the group consisting of platinoid metals (so-called noble metals), and titanium (Ti), said $NO_x$ purifying catalyst adsorbing $NO_x$ in the exhaust gas onto a surface thereof when the exhaust gas is lean, and reducing the adsorbed $NO_x$ to $N_2$ when the exhaust gas is not leaner than stoichiometric, and wherein the exhaust gas is purified by adsorbing $NO_x$ in the exhaust gas onto said $NO_x$ purifying catalyst when the internal combustion engine is being operated under a lean condition, and by setting, after the adsorption, the exhaust gas to an air-fuel ratio state not leaner than stoichiometric for 0.5 second to 4.5 seconds to reduce the $NO_x$ adsorbed on said $NO_x$ purifying catalyst to $N_2$ through catalytical reaction with a reducing agent.

2. A method of purifying an exhaust gas of an internal combustion engine according to claim 1, wherein said alkaline metal of said $NO_x$ purifying catalyst is potassium (K) and sodium (Na), said alkaline earth metal being magnesium (Mg), calcium (Ca) and strontium (Sr), said rare earth metal being lanthanum (La) and cerium (Ce), said platinoid metal being platinum (Pt), rhodium (Rh) and palladium (Pd).

3. A method of purifying an exhaust gas of an internal combustion engine according to claim 1, wherein said composititon is supported on a heat resistant porous metal oxide.

4. A method of purifying an exhaust gas of an internal combustion engine according to claim 1, wherein in said not leaner than stoichiometric state, a depth of said rich state is between 13.0 to 14.7 by air-to-fuel ratio A/F.

5. An apparatus for purifying an exhaust gas of an internal combustion engine comprising an $NO_x$ purifying catalyst arranged in an exhaust gas passage and a control unit, wherein said $NO_x$ purifying catalyst is made of a composition consisting of at least one kind of element selected from the group consisting of alkaline metals and alkaline earth metals, at least one kind of element selected from the group consisting of rare earth metals, at least one kind of element selected from the group consisting of platinoid metals, and titanium (Ti), said $NO_x$ purifying catalyst adsorbing $NO_x$ in the exhaust gas on the surface when the exhaust gas is lean, and reducing the adsorbed $NO_x$ to $N_2$ when the exhaust gas is not leaner than stoichiometric, and wherein said control unit has air-to-fuel ratio control means, said air-to-fuel ratio control means having means for controlling the exhaust gas to a not leaner than stoichiometric state for 0.5 second to 4.5 seconds to purify the exhaust gas by reducing the $NO_x$ adsorbed on said $NO_x$ purifying catalyst to $N_2$ through catalytic reaction with a reducing agent when the internal combustion engine is being operated under a lean condition.

6. An apparatus for purifying an exhaust gas of an internal combustion engine according to claim 5, wherein said alkaline metal of said $NO_x$ purifying catalyst is potassium (K) and sodium (Na), said alkaline earth metal being magnesium (Mg), calcium (Ca) and strontium (Sr), said rare earth metal being lanthanum (La) and cerium (Ce), said platinoid metal being platinum (Pt), rhodium (Rh) and palladium (Pd).

7. An apparatus for purifying an exhaust gas of an internal combustion engine according to claim 5, wherein said compositition is supported on a heat resistant porous metal oxide.

8. An apparatus for purifying an exhaust gas of an internal combustion engine according to claim 5, wherein in said control of the exhaust gas to a not leaner than stoichiometric state, a depth of said rich state is between 13.0 to 14.7 by air-to-fuel ratio A/F.

9. A method of purifying an exhaust gas of an internal combustion engine according to claim 1, wherein said engine is a gasoline engine.

* * * * *